(No Model.)
G. S. ADAMS, J. ROACH & E. A. SHERWOOD.
RACK COLLAR FOR THE TEMPERING WHEELS OF PUG MILLS.
No. 351,086. Patented Oct. 19, 1886.
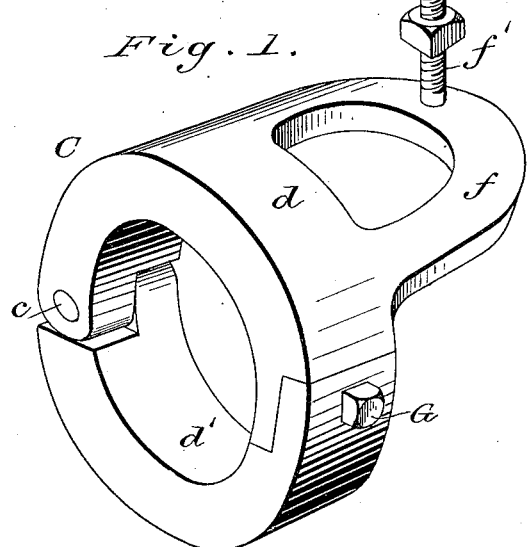
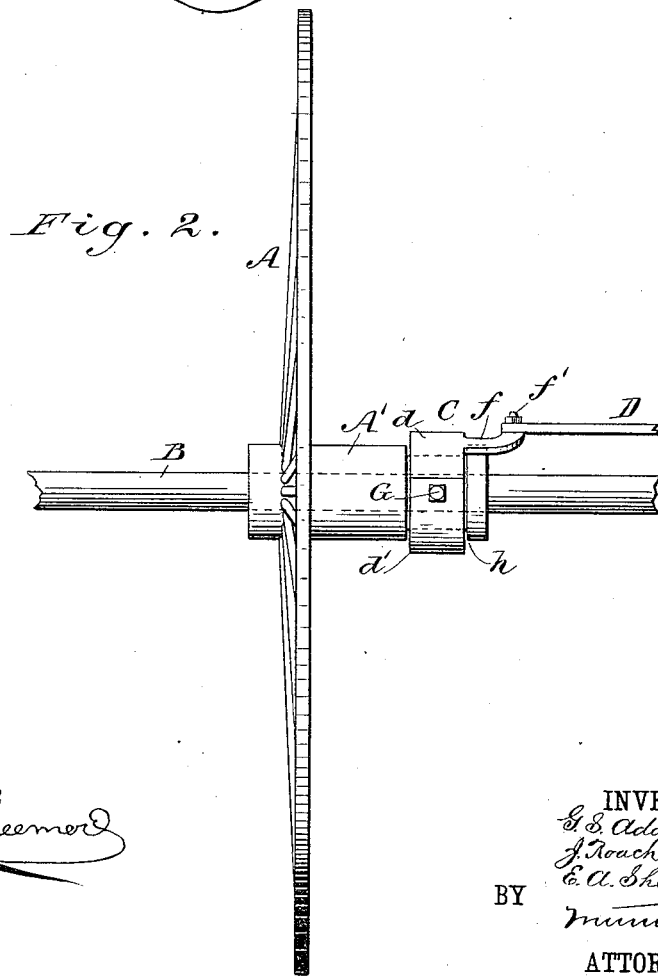
WITNESSES:
INVENTOR:
G. S. Adams
J. Roach
E. A. Sherwood
BY
ATTORNEYS.

UNITED STATES PATENT OFFICE.

GEORGE S. ADAMS, JAMES ROACH, AND ELMER A. SHERWOOD, OF RONDOUT, NEW YORK.

RACK-COLLAR FOR THE TEMPERING-WHEELS OF PUG-MILLS.

SPECIFICATION forming part of Letters Patent No. 351,086, dated October 19, 1886.

Application filed April 8, 1886. Serial No. 198,203. (No model.)

*To all whom it may concern:*

Be it known that we, GEORGE S. ADAMS, JAMES ROACH, and ELMER A. SHERWOOD, all of Rondout, in the county of Ulster and State of New York, have invented certain new and useful Improvements in Rack-Collars for the Tempering-Wheels of Pug-Mills, of which the following is a full, clear, and exact description.

Our invention consists of a pug-mill tempering-wheel collar made in two parts, hinged together, and adapted to be held in place upon the bushing or hub of the wheel by a bolt or screw, so that by removing the screw the collar may be easily removed and as easily replaced without removing the tempering-wheel from its shaft or axle.

Reference is to be had to the accompanying drawings, forming part of this specification, in which similar letters of reference indicate corresponding parts in both the figures.

Figure 1 is a perspective view of our new and improved rack-collar; and Fig. 2 shows the application of the collar.

A represents the tempering-wheel of a pug-mill; B, its shaft or axle, and C represents our new collar applied to the hub or bushing A' of the wheel A.

The collar C is made in two semicircular parts or sections, $d$ $d'$. The section $d$ is formed with the horizontal D-shaped loop $f$, which is formed or provided with the pin $f'$, for connecting to the collar the rack-bar D, by which the wheel A is moved slowly back and forth upon the shaft or axle B, in the usual manner. The section $d'$ is hinged to the section $d$ by the hinge-pin $c$, and the opposite meeting ends of the sections are rabbeted to form a lap-joint, and through the rabbeted portions is passed the bolt $g$, for securing the collar in place in the circumferential groove $h$ of bushing A'.

By removing the screw $g$ the sections $d$ $d'$ may be opened and the collar easily removed from the bushing, while the wheel A remains upon the axle or shaft B, and the collar may be as easily replaced and secured by inserting the bolt $g$, thus saving much labor, and the collar is cheap, durable, and practical.

Having thus described our invention, what we claim as new, and desire to secure by Letters Patent, is—

As a new and improved article of manufacture, the tempering-wheel collar C, made in sections $d$ $d'$, hinged together and adapted to be locked by the bolt $g$, the section $d$ being formed with the bow $f$, substantially as and for the purposes set forth.

GEORGE S. ADAMS.
JAMES ROACH.
ELMER A. SHERWOOD.

Witnesses:
GEORGE MAXHAM,
LOUIS ROBERTS.